(12) United States Patent
Fan (10) Patent No.: US 9,573,727 B2
(45) Date of Patent: Feb. 21, 2017

(54) PACKING BOX

(71) Applicant: ScienBiziP Consulting (Shen Zhen) Co., Ltd., Shenzhen (CN)

(72) Inventor: Xiao-Fei Fan, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 246 days.

(21) Appl. No.: 14/228,641

(22) Filed: Mar. 28, 2014

(65) Prior Publication Data
US 2014/0360907 A1 Dec. 11, 2014

(30) Foreign Application Priority Data

Jun. 11, 2013 (CN) .......................... 2013 2 3342069

(51) Int. Cl.
| | |
|---|---|
| B65D 85/48 | (2006.01) |
| B65D 25/10 | (2006.01) |
| B65D 6/00 | (2006.01) |
| B65D 25/24 | (2006.01) |
| B65D 6/02 | (2006.01) |
| B65D 25/20 | (2006.01) |
| B65D 81/113 | (2006.01) |
| B62B 3/00 | (2006.01) |

(52) U.S. Cl.
CPC ............... B65D 25/10 (2013.01); B62B 3/005 (2013.01); B65D 7/065 (2013.01); B65D 7/12 (2013.01); B65D 9/06 (2013.01); B65D 11/10 (2013.01); B65D 25/20 (2013.01); B65D 25/24 (2013.01); B65D 81/113 (2013.01); B65D 2585/6837 (2013.01)

(58) Field of Classification Search
CPC ........... B62B 3/005; B65D 7/065; B65D 9/06; B65D 11/10; B65D 25/10; B65D 25/24; B65D 7/12; B65D 81/113; B65D 2585/6837
USPC ........ 206/449, 486, 523, 587, 593; 220/504, 220/810, 819, 826; 312/244, 351.11, 902
See application file for complete search history.

(56) References Cited

U.S. PATENT DOCUMENTS

| | | | | |
|---|---|---|---|---|
| 3,061,136 | A * | 10/1962 | Sterngart | A45C 11/00 220/23.8 |
| 5,402,885 | A * | 4/1995 | Cook | H01L 21/67356 206/723 |
| 5,423,404 | A * | 6/1995 | Shaw | A45C 3/00 190/102 |
| 6,062,385 | A * | 5/2000 | Cho | A45C 3/02 206/216 |
| 6,499,592 | B2 * | 12/2002 | Wilfer | G10G 7/005 190/102 |

(Continued)

*Primary Examiner* — Luan K Bui
(74) *Attorney, Agent, or Firm* — Zhigang Ma (57) ABSTRACT

A packing box can include a first cover, a second cover, a first sidewall, a second sidewall, a third sidewall, a fourth sidewall, and a bulkhead. The first cover and the second cover can be opposite to each other. The four sidewalls can be sequentially coupled end-to-end. The bulkhead can be received in the main box and be substantially parallel to the first cover and the second cover. Four edges of the bulkhead can be coupled to the four sidewalls, respectively. An inner receiving space of the main box can be divided into a first receiving cavity and a second receiving cavity by the bulkhead. A number of receiving portions can be defined on a surface of the packing box facing the first receiving cavity.

19 Claims, 8 Drawing Sheets

(56) References Cited

U.S. PATENT DOCUMENTS

| | | | | |
|---|---|---|---|---|
| 7,434,410 B2 * | 10/2008 | Ford | ................... | F25D 3/08 |
| | | | | 62/371 |
| 8,550,243 B2 * | 10/2013 | Moore | ................... | A45C 13/02 |
| | | | | 206/315.1 |
| 2005/0167221 A1 * | 8/2005 | Mohr | ................... | A45C 5/04 |
| | | | | 190/23 |
| 2007/0045331 A1 * | 3/2007 | Schafer | ................ | B65D 11/18 |
| | | | | 220/826 |
| 2012/0255965 A1 * | 10/2012 | King | ................... | B65D 43/164 |
| | | | | 220/826 |

* cited by examiner

PACKING BOX

FIELD

The present disclosure relates to packing boxes, and particularly to a packing box used for packing medium or large-sized electronic devices.

BACKGROUND

When a medium or a large-sized electronic device, such as a flat panel television or a computer monitor, needs to be packed, a carton may be used for packaging. Foam may be received in the carton cushion the electronic device. The foam can be used to define a plurality of receiving cavities for receiving the electronic device and accessories of the electronic device. As a result, the electronic device and the accessories may be positioned separate from each other and will be protected by the foam. However, when the packed carton is transported or moved, one or more of the packed items may shift from the receiving cavities and damage one or more of the other packed items, including the electronic device.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Several definitions that apply throughout this disclosure will now be presented. The term "coupled" is defined as connected, whether directly or indirectly through intervening components, and is not necessarily limited to physical connections. The connection can be such that the objects are permanently connected or releasably connected.

FIGS. 1 through 4 show a first embodiment of a packing box 100. The packing box 100 can include a main box 10 with a plurality of handles 50, rolling members 70, and supporting members 90. The plurality of handles 50, rolling members 70, and supporting members 90 can be mounted to the main box 10.

The main box 10 can be substantially a cuboid housing and include a first cover 11, a second cover 12, four sidewalls, and a bulkhead 17. The second cover 12 can be substantially parallel and opposite to the first cover 11. The four sidewalls can include a first sidewall 13, a second sidewall 14, a third sidewall 15, and a fourth sidewall 16. The four sidewalls can be sequentially coupled end-to-end, and each of the four sidewalls can be coupled to the first cover 11 and the second cover 12. The third sidewall 15 can be substantially parallel and opposite to the first sidewall 13, and the fourth sidewall 16 can be substantially parallel and opposite to the second sidewall 14. The first cover 11, the second cover 12, and the four sidewalls can cooperatively define an inner receiving space 180. The bulkhead 17 can be mounted in the inner receiving space 180 of the main box 10, and be substantially parallel to the first cover 11. As a result, the bulkhead 17 can divide the inner receiving space 180 into a first receiving cavity 18 and a second receiving cavity 19. In alternative embodiments, the bulkhead 17 can divide the inner receiving space 180 into more than two receiving cavities. In the illustrated embodiment, the main box 10 can be made of wooden material. In an alternative embodiment, the main box 10 can be made of other durable materials, for example metal or plastic.

Protecting strips 101 can be located on each edge of the main box 10, and covering members 103 can be located on each corner of the main box 10. The protecting strips 101 and the covering members 103 can reinforce and protect the main box 10 from external impact. In one embodiment, the protecting strips 10 and the covering members 103 can be made of aluminum. In an alternative embodiment, the protecting strips 10 and the covering members 103 can be made of suitable other materials, such as, but not limited to, metal or plastic.

The first cover 11 can include a first plate 111, a second plate 113, and a first locking member 115. The first plate 111 and the second plate 113 can be substantially coplanar to each other when the main box 10 is in a closed state (shown in FIG. 1). An edge of the first plate 111 away from the second plate 113 can be pivotably coupled to a corresponding edge of the third sidewall 15, such that the first plate 111 is rotatable relative to the third sidewall 15. Additionally, an edge of the second plate 113 away from the first plate 111 can be pivotably coupled to a corresponding edge of the first sidewall 13, such that the second plate 113 is rotatable relative to the first sidewall 13. The first locking member 115 can be coupled to the first plate 111. When the first plate 111 and the second plate 113 cooperatively cover the inner receiving space 180, the first locking member 115 can lock the first plate 111 and the second plate 113 in the closed state. When the first locking member 115 is released, the first plate 111 and the second plate 113 can be unfolded as a set of hinged doors.

Figure 3:
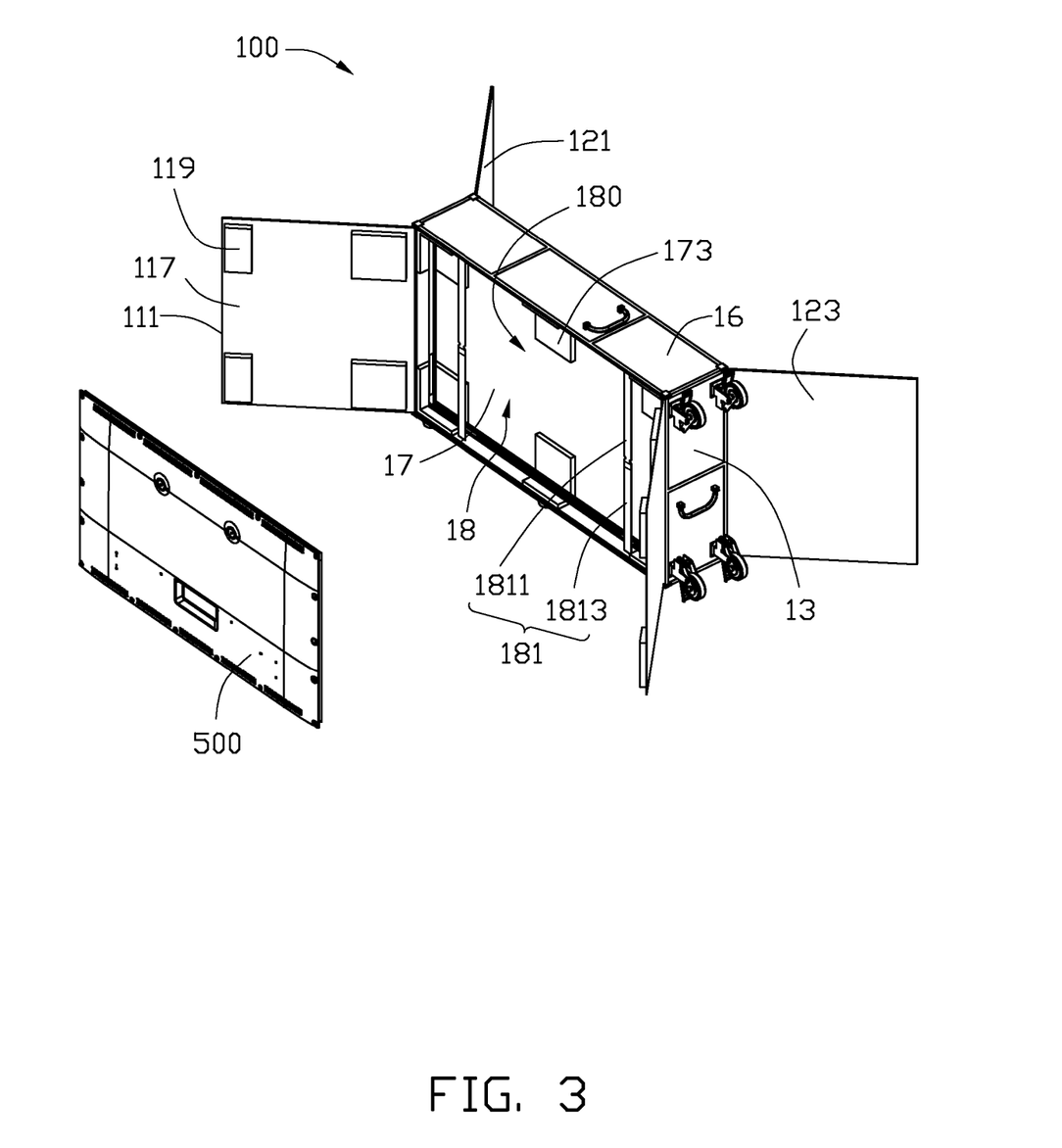
FIG. 3 is an isometric of the packing box of FIG. 1 in an open state.

A protecting layer 117 facing the bulkhead 17 can be located on an inner surface of each of the first plate 111 and the second plate 113. The protecting layer 117 can provide for cushioning for an electronic device 500 (shown in FIG. 3) or other packed item when the packing box 100 holds the electronic device 500 (or other packed item) therein, thereby preventing the electronic device 500 (or other packed item) from being damaged by hard material of the first plate 111 and the second plate 113. In one embodiment, the protecting layer 117 can be made of EVA foam. A plurality of cushions 119 can be located on each of the protecting layers 117. The cushions 119 can firmly press against the electronic device 500 (or other packed item) contained in the main box 10, thereby holding the electronic device 500 (or other packed item) firmly in the main box 10. In one embodiment, the cushions 119 can be made of EPE foam. FIG. 3 shows, four cushions 119 positioned on the first plate 111 and the second plate 113, with the four cushions 119 located at four corners of the corresponding protecting layer 117. An alternative embodiment, can include a different number of cushions 119 attached to the first plate 111 and the second plate 113. The protecting layer 117 and the cushions 119 can be made of other soft material, such as, but not limited to, sponge or soft rubber.

The second cover 12 can be substantially parallel and opposite to the first cover 11. A structure of the second cover 12 can be substantially identical to a structure of the first cover 11. The second cover 12 can include a third plate 121, a fourth plate 123, and a second locking member 125. An edge of the third plate 121 away from the fourth plate 123 can be pivotably coupled to a corresponding edge of the third sidewall 15, such that the third plate 121 is rotatable relative to the third sidewall 15. An edge of the fourth plate 123 away from the third plate 121 can be pivotably coupled to a corresponding edge of the first sidewall 13, such that the fourth plate 123 is rotatable relative to the first sidewall 13. The second locking member 125 can be located on the third plate 121 adjacent to the fourth plate 123. When the third plate 121 and the fourth plate 123 cooperatively cover the second receiving cavity 19, the second locking member 125 can lock the third plate 121 and the fourth plate 123 in the closed state. The protecting layers 117 can be located on inner surfaces of the third plate 121 and the fourth plate 123.

The four handles 50 can be rotatably coupled to the four sidewalls, respectively, for carrying the main box 10 by hand conveniently. In an alternative embodiment, the four handles 50 can be omitted, or the number and position of the handles 50 can be changed according to actual needs.

Figure 4:
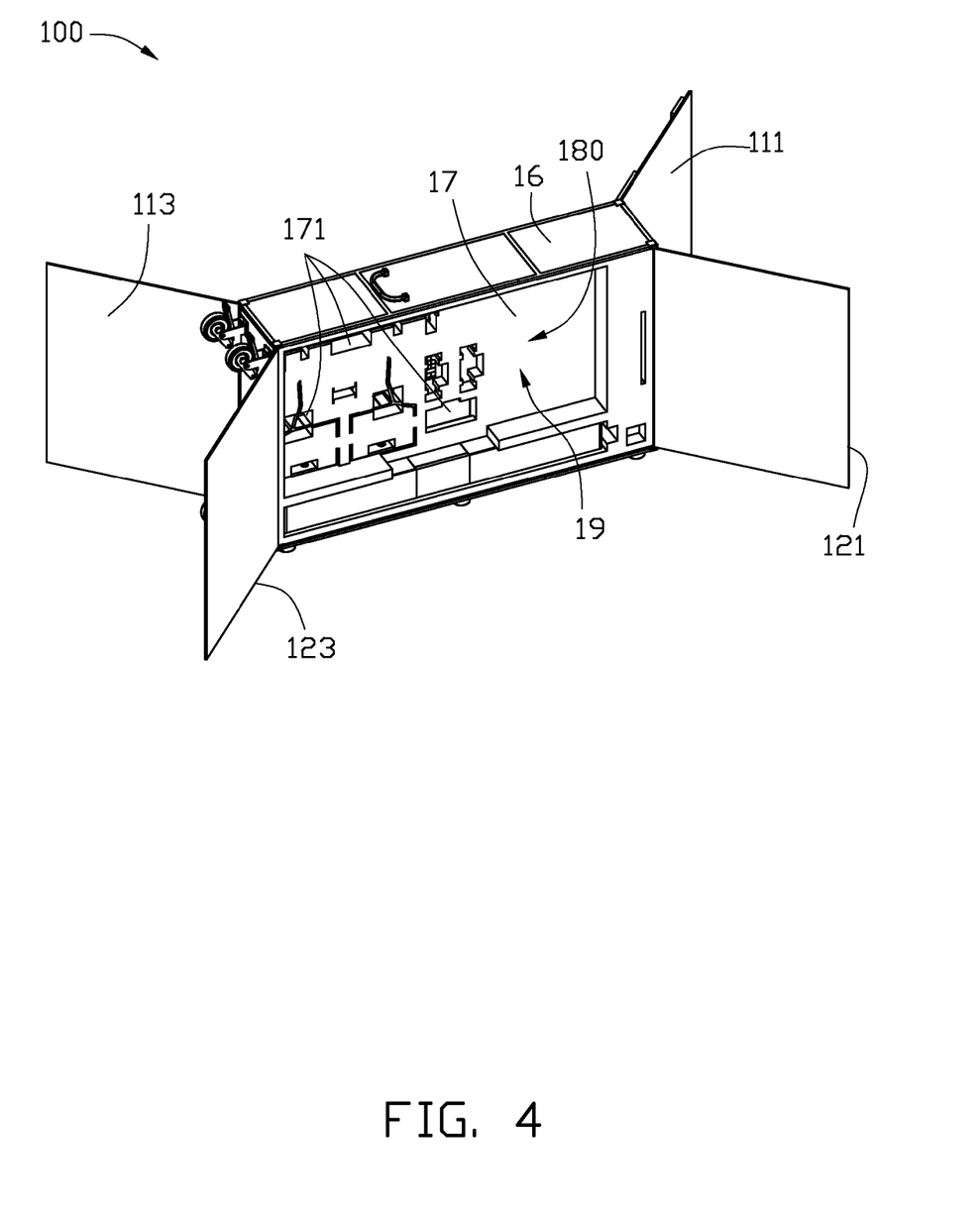
FIG. 4 is similar to FIG. 3, but viewed from another aspect.

The bulkhead 17 can be positioned in the inner receiving space 180 of the main box 10. One or more of the four edges of the bulkhead 17 can be fixed to the first sidewall 13, the second sidewall 14, the third sidewall 15, and the fourth sidewall 16, respectively. The bulkhead 17 can divide the inner receiving space 180 into the first receiving cavity 18 and the second cavity 19, such that the first receiving cavity 18 and the second receiving cavity 19 do not communicate with each other. A protecting layer (not labeled) similar to the protecting layer 117 can be located on a surface of the bulkhead 17 adjacent to the first cover 11. A plurality of protecting pads 173 can be located on the protecting layer and inner surfaces of the four sidewalls. The protecting pads 173 can cushion the electronic device 500 (or other packed item).

The main box 10 can further include at least one elastic band 181 received in the first receiving cavity 18. In the illustrated embodiment, there are two elastic bands 181. Two ends of each elastic band 181 can be coupled to the second sidewall 14 and the fourth sidewall 16, respectively. The elastic bands 181 can secure the electronic device 500 (or other packed item) in the first receiving cavity 18. Each elastic band 181 can include a first elastic portion 1811 and a second elastic portion 1183. A structure of the first elastic portion 1811 can be substantially similar to a structure of the second elastic portion 1813. A distal end of the first elastic portion 1811 can be coupled to the fourth sidewall 16. A distal end of the second elastic portion 1813 can be coupled to the second sidewall 14. A free end of the first elastic portion 1811 can be detachably coupled to a free end of the second elastic portion 1813. The first elastic portion 1811 can be easily released from the second elastic portion 1813, such that the electronic device 500 (or other packed item) is conveniently received into or taken out from the first receiving cavity 18. In an alternative embodiment, two ends of each elastic band 181 can be coupled to the first sidewall 13 and the third sidewall 15, respectively.

The second receiving cavity 19 can be used for receiving accessories of the electronic device 500 (or other packed item) (accessories are not shown). The accessories can include, but are not limited to, a remote controller, a power cord, and a supporting frame. A surface of the bulkhead 17 facing the second receiving cavity 19 can define a plurality of receiving portions 171. In the illustrated embodiment, the receiving portions 171 receive the accessories.

Figure 1:
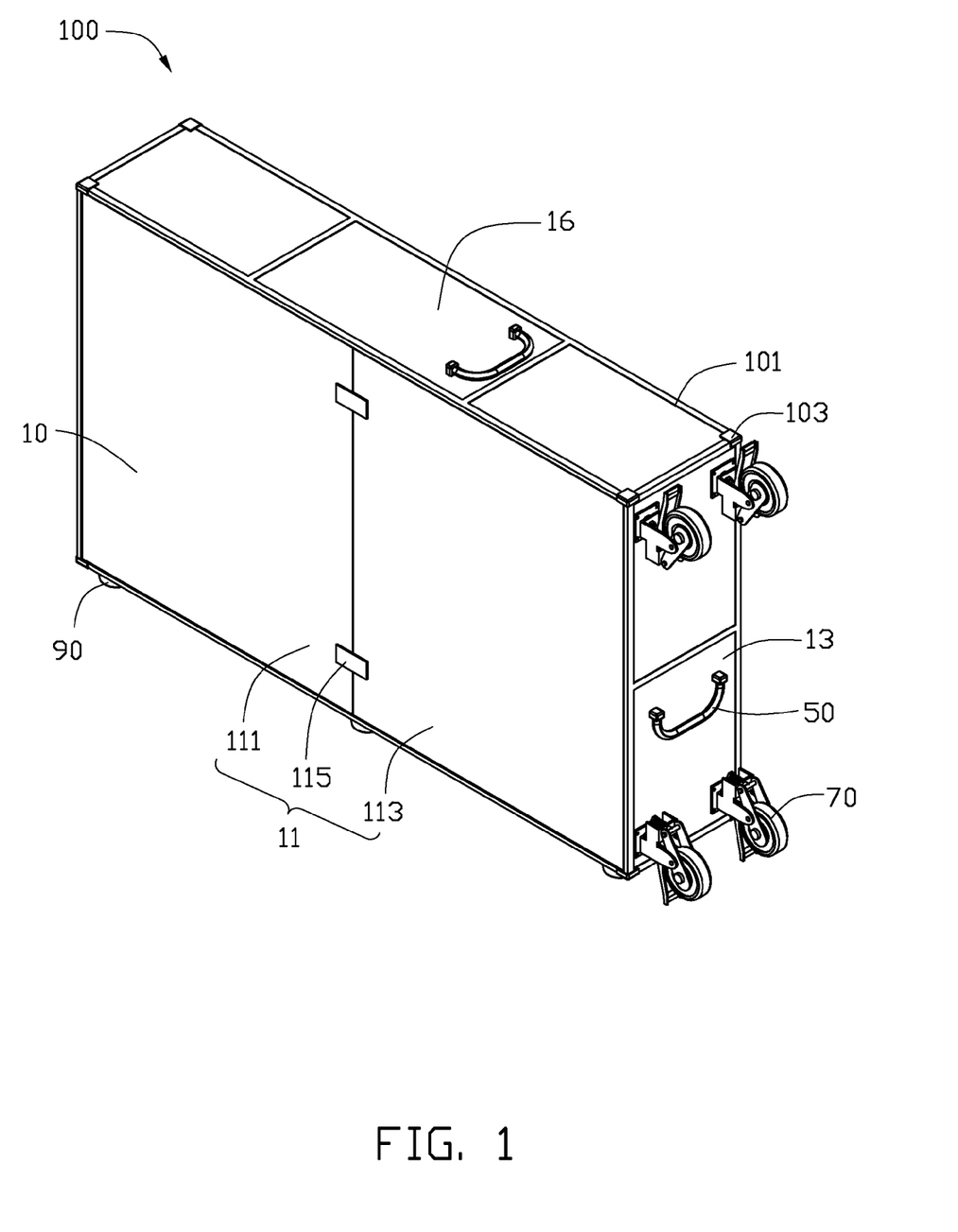
FIG. 1 is an isometric view of a first embodiment of a packing box in a closed state.
Figure 2:
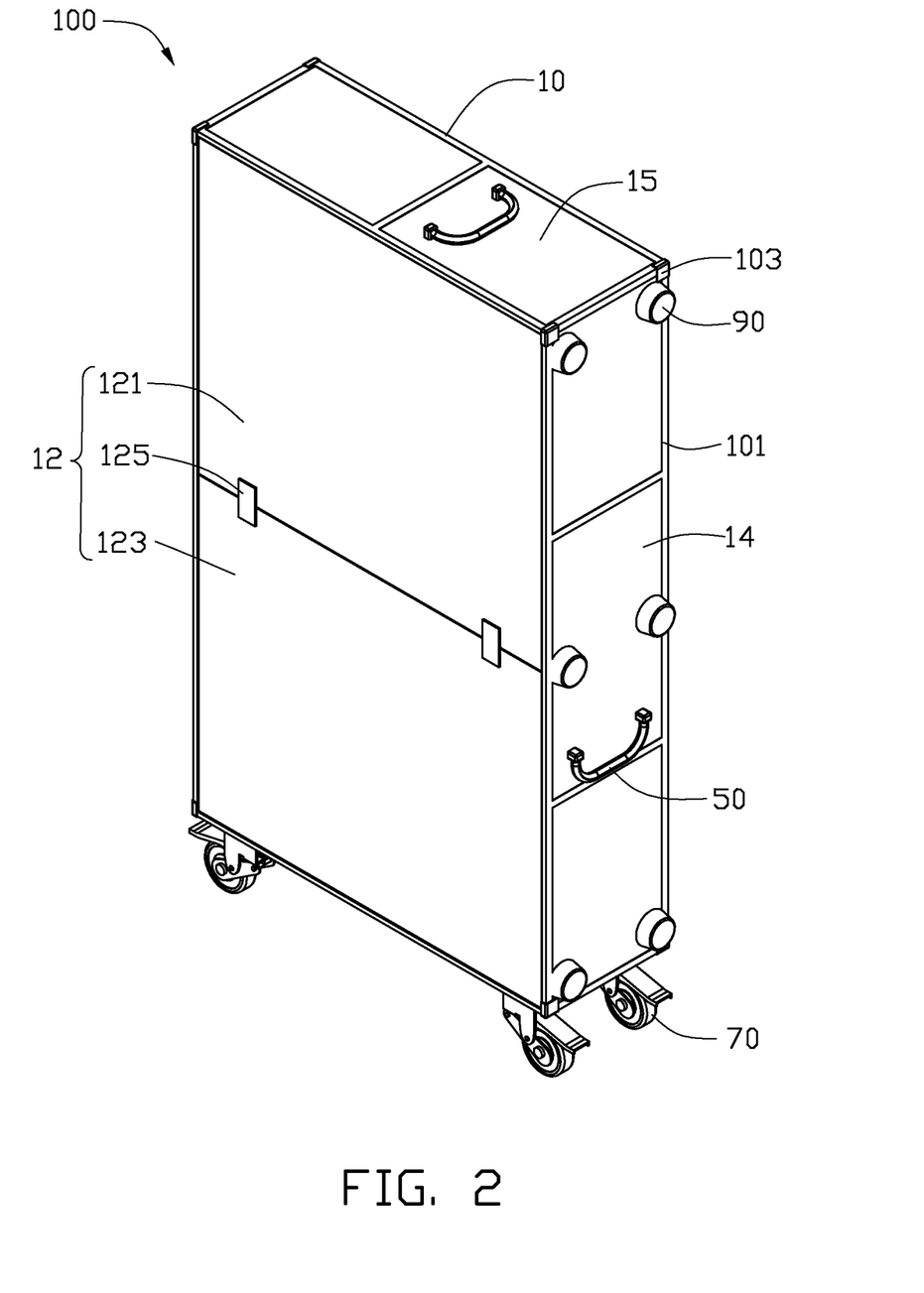
FIG. 2 is similar to FIG. 1, but viewed from another aspect.

The plurality of rolling members 70 can be located on the first sidewall 13 for supporting and easily transporting the main box 10. In the illustrated embodiment, there are four rolling members 70 arranged at four corners of the first sidewall 13. In one embodiment, the four rolling members 70 are wheels. When the packing box 100 is supported by the rolling members 70 on the ground, the main box 10 is in an upright orientation. Thus, the main box 10 can be easily pulled and transported.

The plurality of supporting members 90 can be located on the second sidewall 14 for supporting the main box 10. In the illustrated embodiment, there are six supporting members 90, and the six supporting members 90 are symmetrically arranged on the second sidewall 14. When the packing box 100 is supported by the supporting members 90, the packing box 100 has a reduced center of gravity and can be stably stored.

In use, the first locking member 115 is released, such that the first plate 111 and the second plate 113 can be opened. Then, the first elastic portion 1811 and the second elastic portion 1813 of each elastic band 181 are detached. The electronic device 500 (or other packed item) is positioned in the first receiving cavity 18, and then the first elastic portion 1811 and the second elastic portion 1813 are re-attached to secure the electronic device 500 (or other packed item). Then, the first plate 111 and the second plate 113 are closed and locked. The third plate 121 and the fourth plate 123 are opened, and the accessories of the electronic device 500 (or other packed item) are positioned in the corresponding receiving portions 171. Then, the third plate 121 and the fourth plate 123 are closed and locked.

In transport, the packing box 100 can be rolled by the rolling members 70, and be pulled by the handles 50. In storage, the packing box 100 can be stored by being supported on the plurality of supporting members 90.

Figure 5:
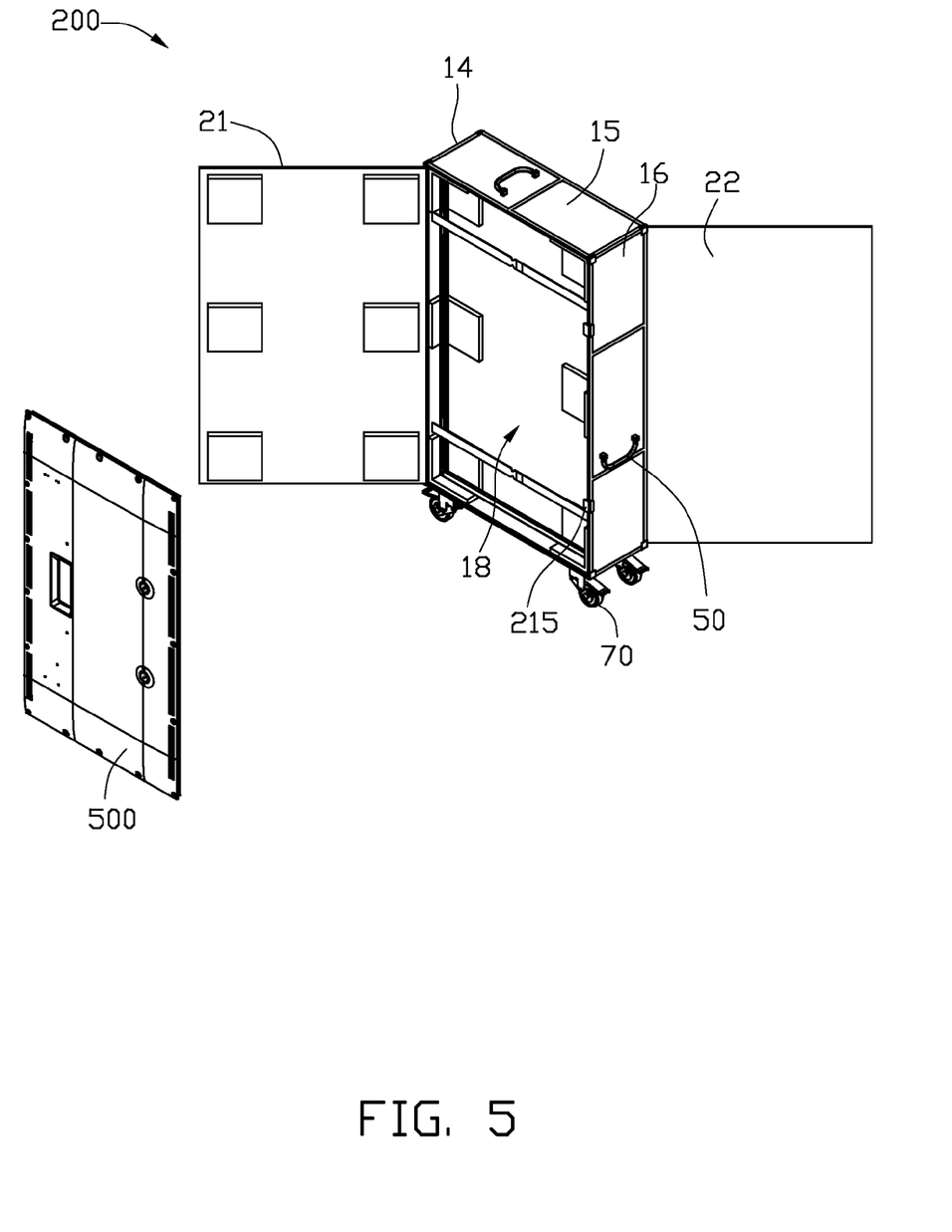
FIG. 5 is an isometric view of a second embodiment of a packing box in an open state.
Figure 6:
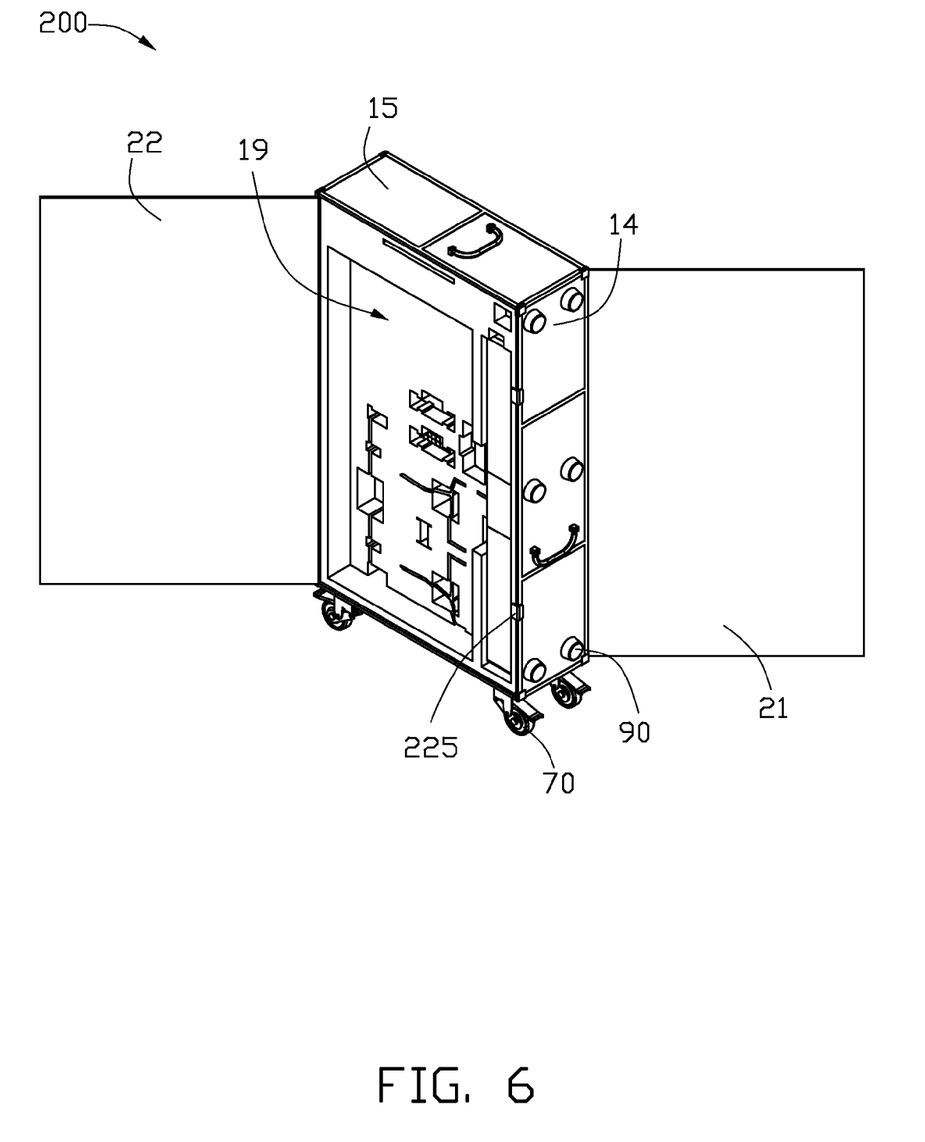
FIG. 6 is similar to FIG. 5, but viewed from another aspect.

FIGS. 5 and 6 show a second embodiment of a packing box 200. A structure of the packing box 200 can be substantially similar to a structure of the packing box 100 of the first embodiment, except for the following differences.

A first cover 21 can be a single integrated piece and be substantially rectangular. An edge of the first cover 21 can be pivotably coupled to a corresponding edge of the second sidewall 14, such that the first cover 21 is rotatable relative to the second sidewall 14. A first locking member 215 can be located on the fourth sidewall 16. When the first cover 21 covers the first receiving cavity 18, the first locking member 215 can lock the first cover 21 to the fourth sidewall 16.

A structure of a second cover 22 can be substantially identical to a structure of the first cover 21. An edge of the second cover 22 can be pivotably coupled to a corresponding edge of the fourth sidewall 16, such that the second cover 22 is rotatable relative to the fourth sidewall 16. A second locking member 225 can be located on the second sidewall 14. When the second cover 22 covers the second receiving cavity 19, the second locking member 225 can lock the second cover 225 to the second sidewall 14.

Figure 7:
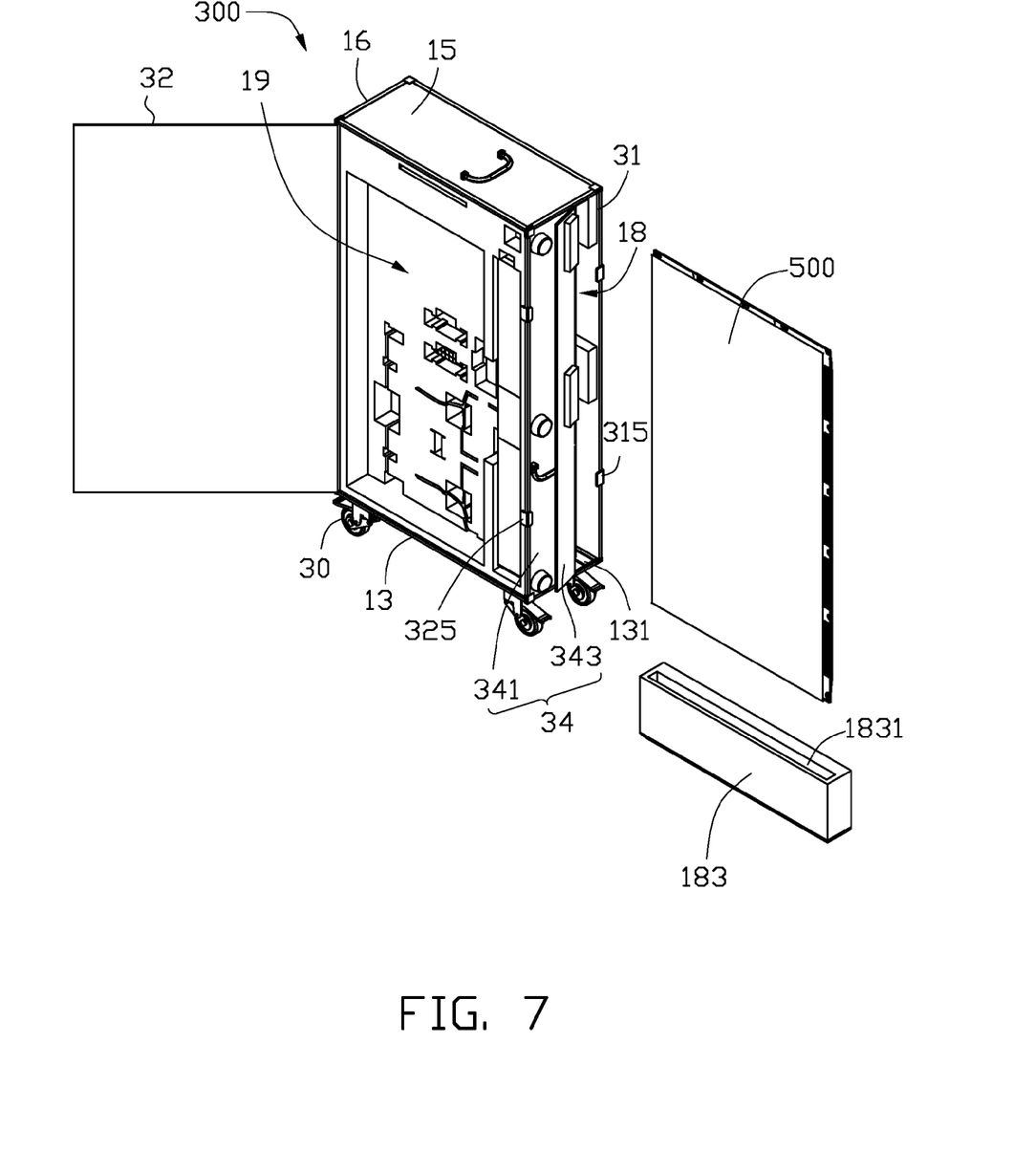
FIG. 7 is an isometric view of a third embodiment of a packing box in an open state.
Figure 8:
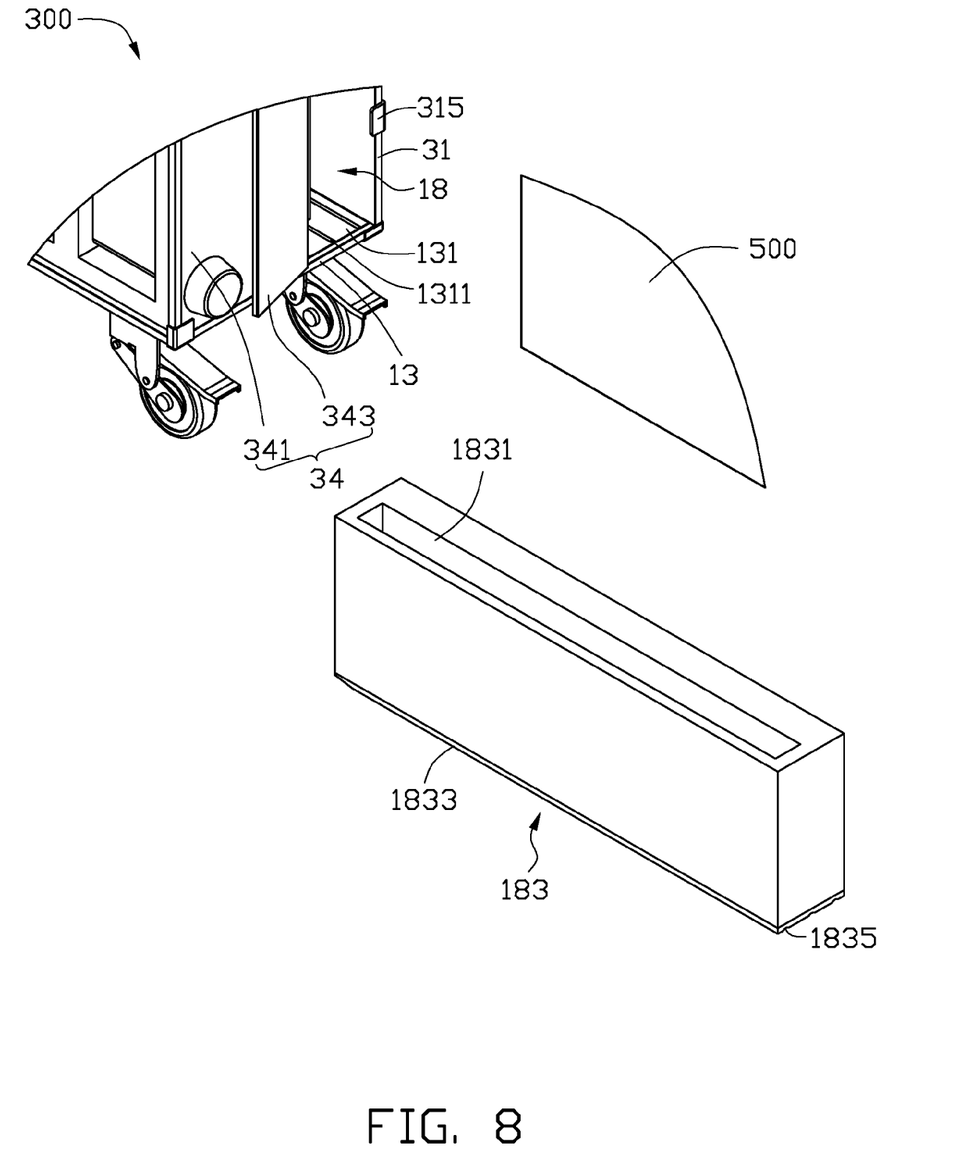
FIG. 8 is a partial, exploded view of the packing box of FIG. 7.

FIGS. 7 and 8 show a third embodiment of a packing box 300. A structure of the packing box 300 can be substantially similar to a structure of the packing box 200 of the second embodiment, except for the following differences.

Three edges of a first cover 31 can be fixed to the first sidewall 13, the third sidewall 15, and the fourth sidewall 16, respectively. A first locking member 315 can be located on the first cover 31 adjacent to the second sidewall 34. A second cover 32 can be substantially similar to the second cover 22 of the second embodiment. A surface of the first sidewall 13 facing the first receiving cavity 18 can provide a guiding surface 131. A plurality of guiding rails 1311 can be located on the guiding surface 131. There is no elastic band 181 in the third embodiment. A base 183 can be positioned in the first receiving cavity 18 for supporting the electronic device 500 (or other packed item). The base 183 can be substantially a rectangular block and be slidably engaged with the guiding surface 131. The base 183 can define a receiving groove 1831 in a surface away from the guiding surface 131 for partially receiving the electronic device 500. The base 183 can further define a plurality of sliding grooves 1835 corresponding to the plurality of guiding rails 1311. Each of the sliding grooves 1835 can slidably receive one corresponding guiding rail 1311, such that the base 183 is slidably received into the first receiving cavity 18. Thus, it is convenient to pull the base 183 out or push the base 183 into the first receiving cavity 18.

A second sidewall 34 can include a fifth plate 341 adjacent to the second cover 32, and a sixth plate 343 can be located adjacent to the first cover 31. The fifth plate 341 and the sixth plate 343 can be substantially coplanar to each other when the main box 10 is in a closed state. Two opposite edges of the fifth plate 341 can be coupled to corresponding edges of the first sidewall 13 and the third sidewall 15, respectively. When the second cover 32 covers the second receiving cavity 19, a second locking member 325 can lock the second cover 32 to the fifth plate 341. An edge of the sixth plate 343 can be pivotably coupled to a corresponding edge of the fifth plate 341. When the sixth plate 343 covers the first receiving cavity 18, the first locking member 315 can lock the sixth plate 343 to the first cover 31. A surface of the sixth plate 343 facing the first cavity 18 can include a protecting layer (not labeled) and a plurality of cushions (not labeled).

In use of the packing box 300, the first locking member 315 is released, the sixth plate 343 is opened, and the base 183 is slid out from the first receiving cavity 18 along the guiding rails 1311. The electronic device 500 (or other packed item) is partially received into the receiving groove 1831, and then the base 183 is slid back into the first receiving cavity 18 along the guiding rails 1311. The sixth plate 343 is closed and locked to the first cover 31. The second locking member 325 is released, and the second cover 32 is opened. The accessories of the electronic device 500 are received into the corresponding receiving portions 171. Then, the second cover 32 is closed and locked to the fifth plate 341.

Transport and storage of the packing box 300 can be substantially similar to the transport and storage of the packing box 100. In an alternative embodiment, the first cover 31 illustrated in the third embodiment can be identical to the first cover 11 of the first embodiment, and the second cover 32 of the third embodiment can be identical to the second cover 12 of the first embodiment.

In an alternative embodiment, the plurality of supporting members 90 can be located on the fourth sidewall 16. A number of the supporting members 90 can be two or other suitable number. The supporting members 90 can be omitted, such that the rolling members 70 can be locked to stop the packing box 100 from moving when stored. The elastic band 181 can be omitted, such that the cushion pads 119 cooperate with the protecting pads 173 to firmly cushion the electronic device 500 received in the first receiving cavity 18.

It is believed that the present embodiments and their advantages will be understood from the foregoing description, and it will be apparent that various changes can be made thereto without departing from the spirit and scope of the embodiments or sacrificing all of its material advantages.

What is claimed is:

1. A packing box, comprising:
    a main box comprising:
        a first cover;
        a second cover located at an opposite end of the box from the first cover;
        four sidewalls comprising a first sidewall, a second sidewall, a third sidewall, and a fourth sidewall; the first sidewall and the third sidewall being parallel to and spaced apart from each other; the second and fourth sidewalls parallel to and spaced apart from each other and perpendicular to the first and the third sidewall; wherein the four sidewalls are sequentially coupled end-to-end, and each one of the four sidewalls coupled to the first cover and the second cover; and
        a bulkhead positioned in the main box, and attached to at least one sidewalls;
    wherein the bulkhead and the first cover define a first receiving cavity, and the bulkhead and the second cover define a second receiving cavity; wherein the second receiving cavity comprises a plurality of receiving portions; and
    wherein the main box further comprises at least one elastic band received in the first receiving cavity, the at least one elastic band comprises a first elastic portion and a second elastic portion; a distal end of the first elastic portion is coupled to the second sidewall; a distal end of the second elastic portion is coupled to the fourth sidewall, and the other end of the second elastic portion is detachably attached to a free end of the first elastic portion.

2. The packing box of claim 1 further comprising a plurality of rolling members; wherein, the plurality of rolling members are positioned on one of the first, second, third, and fourth sidewalls.

3. The packing box of claim 1, further comprising a plurality of supporting members; and wherein the plurality of supporting members is attached to one of the first, second, third, and fourth sidewalls.

4. The packing box of claim 1, further comprising a first locking member;
    wherein,
        the first cover is pivotally coupled to the first and third sidewalls; and
        the first locking member is positioned on a side and to which the first cover is not pivotally coupled; and
        wherein when the first cover is closed, the first locking member locks the first cover in place.

5. The packing box of claim 4, further comprising a second locking member; and
wherein,
the second cover is pivotally connected to the first and third sidewalls; and
the second locking member is positioned on a sidewall to which the second cover is not pivotally connected; and
wherein when the second cover is closed, the second locking member locks the second cover in place.

6. The packing box of claim 1 further comprising a first locking member; wherein the first cover comprises a first plate and a second plate; the first plate is pivotally coupled to the third sidewall, and the second plate is pivotably coupled to the first sidewall; and
the first locking member is positioned on the first plate adjacent to the second plate; and
wherein when the first plate and the second plate are closed, the first locking member locks the first plate in place.

7. The packing box of claim 6 further comprising a second locking member; wherein the second cover comprises a third plate and a fourth plate; the third plate is pivotally coupled to the third sidewall, the fourth plate is pivotally coupled to the first sidewall; and
the second locking member is positioned on the third plate adjacent to the fourth plate; and
wherein when the third plate and the fourth plate are closed, the second locking member locks the third plate in place.

8. The packing box of claim 1 further comprising a first locking member; and
Wherein,
the second sidewall comprises a fifth plate and a sixth plate; two opposite edges of the fifth plate are coupled to corresponding edges of the first sidewall and the third sidewall, respectively; the sixth plate is pivotally coupled to the fifth plate; and
the first locking member is positioned on the first cover adjacent to the second sidewall, and
the first locking member locks the sixth plate when the sixth plate is closed.

9. The packing box of claim 8, wherein the first sidewall provides a guiding surface on a surface facing to the first receiving cavity of the first sidewall, a plurality of guiding rails are provided on the guiding surface.

10. The packing box of claim 9, wherein the main box further comprises a base slidably positioned on the guiding surface, the base provides a plurality of sliding grooves corresponding to the plurality of guiding rails; each of the plurality of sliding grooves is capable of engaging with one corresponding guiding rail, thereby the base being slidably positioned on the guiding surface.

11. The packing box of claim 10, wherein the base defines a receiving groove on a surface departing from the guiding surface.

12. The packing box of claim 1, wherein a protecting layer facing the bulkhead is located on a surface of the first cover.

13. The packing box of claim 12, wherein a plurality of cushions is located on the protecting layer.

14. The packing box of claim 1, wherein the packing box further comprises a plurality of handles, the plurality of handles is rotatably positioned on one or more of the four sidewalls.

15. The packing box of claim 1, wherein a protecting strip is located at each edge of the protecting thereof, and a covering member is located at each corner thereof.

16. A packing box, comprising:
a main box, comprising:
a first cover;
a second cover opposite to the first cover;
a second sidewall;
a fourth sidewall located substantially parallel and opposite to the second sidewall; and
a bulkhead positioned in the main box, and substantially parallel to the first cover and the second cover, wherein, the bulkhead and the first cover define a first receiving cavity, and the bulkhead and the second cover define a second receiving cavity; wherein the second receiving cavity comprises a plurality of receiving portions; and
wherein, the main box further comprises at least one elastic band received in the first receiving cavity, the at least one elastic band comprises a first elastic portion and a second elastic portion; a distal end of the first elastic portion is coupled to the second sidewall; an distal end of the second elastic portion is coupled to the fourth sidewall, and the other end of the second elastic portion is detachably attached to an free end of the first elastic portion.

17. The packing box of claim 16, further comprising a first locking member; wherein the first cover comprises a first plate and a second plate; the first plate and the second plate is rotatable to cover or uncover the first receiving cavity; and
the first locking member is positioned on the first plate adjacent to the second plate; and
wherein when the first plate and the second plate are closed, the first locking member locks the first plate in place.

18. The packing box of claim 17 further comprising a second locking member; wherein the second cover comprises a third plate and a fourth plate; the third plate and the fourth plate are rotatable to cover or uncover the second receiving cavity; and
the second locking member is positioned on the third plate adjacent to the fourth plate; and
wherein when the third plate and the fourth plate are closed, the second locking member locks the third plate.

19. The packing box of claim 16, further comprising a plurality of rolling members on the main box for supporting and transporting the main box.

* * * * *